United States Patent [19]

Walker

[11] 4,060,677

[45] Nov. 29, 1977

[54] PROCESS FOR MOLECULAR WEIGHT LOWERING OF VINYL HALIDE POLYMERS EMPLOYING SATURATED CARBON TO CARBON BONDED ALDEHYDES

[75] Inventor: Leigh E. Walker, Lewiston, N.Y.

[73] Assignee: Hooker Chemicals & Plastics Corporation, Niagara Falls, N.Y.

[21] Appl. No.: 683,853

[22] Filed: May 6, 1976

Related U.S. Application Data

[63] Continuation-in-part of Ser. No. 552,826, Feb. 25, 1975, abandoned.

[51] Int. Cl.² .................. C08F 2/00; C08F 14/06; C08F 114/06; C08F 214/06
[52] U.S. Cl. .................. 526/88; 260/878 R; 260/884; 526/208; 526/344
[58] Field of Search .............. 260/878, 884; 526/88, 526/208, 84

[56] References Cited

U.S. PATENT DOCUMENTS

| | | | |
|---|---|---|---|
| 1,983,949 | 12/1934 | Semon | 260/92.8 R |
| 2,420,330 | 5/1947 | Shriver et al. | 526/208 |
| 2,616,887 | 11/1952 | Danzig et al. | 526/84 |
| 2,729,627 | 1/1956 | Carr | 526/84 |
| 2,922,768 | 1/1960 | Mino et al. | 260/878 R |
| 3,301,838 | 1/1967 | Heiba | 260/92.8 R |
| 3,324,097 | 6/1967 | Pears | 526/208 |
| 3,475,306 | 10/1965 | Clocker | 260/92.8 R |
| 3,522,227 | 7/1970 | Thomas | 260/87.1 |
| 3,544,660 | 12/1970 | Thomas et al. | 260/878 R |
| 3,761,542 | 9/1973 | Kosaka et al. | 260/878 R |
| 3,812,204 | 5/1974 | Natta et al. | 260/878 R |

FOREIGN PATENT DOCUMENTS 1,047,489  2/1964  United Kingdom.

OTHER PUBLICATIONS

Polymer Preprints vol. 1, No. 1 (1969), pp. 131–138, Gillespie et al.
P. H. Burleigh, Jaes 82 749 (1960).

*Primary Examiner*—Herbert J. Lilling
*Attorney, Agent, or Firm*—P. F. Casella; J. F. Mudd; D. A. Stein

[57] ABSTRACT

Vinyl halide homopolymers, copolymers and graft polymers of substantially lower molecular weight are obtained when polymerization is carried out in bulk in the presence of a small concentration in the polymerization reaction mass of an aldehyde which is devoid of ethylenic and acetylenic unsaturation and which contains at least one carbon to carbon bond. The polymers are obtained without substantial lowering of the polymerization conversion rate and are characterized by excellent fusion properties and improved solubility in organic solvents, which properties render the products useful in molding, extrusion, coating and solution casting applications.

11 Claims, No Drawings

PROCESS FOR MOLECULAR WEIGHT LOWERING OF VINYL HALIDE POLYMERS EMPLOYING SATURATED CARBON TO CARBON BONDED ALDEHYDES

CROSS-REFERENCE TO RELATED APPLICATION

This application is a continuation-in-part of U.S. application Ser. No. 552,826, filed Feb. 25, 1975, and now abandoned.

BACKGROUND OF THE INVENTION

1. Field of the Invention

This invention relates to an improved method of regulating polymer molecular weight in the preparation of homopolymers, copolymers and graft polymers of vinyl halides such as vinyl chloride, in which polymerization is carried out in bulk in the presence of a small concentration of an aldehyde devoid of ethylenic or acetylenic unsaturation without substantially diminishing the conversion rate of the polymerization.

2. Description of the Prior Art

The tendency of certain free radical polymerizable materials such as the vinyl halides to polymerize to relatively high molecular weight polymers under normal polymerization conditions is well known. These high molecular weight polymer products have relatively high fusion temperatures and/or high melt viscosities so that they are generally processed with difficulty in processing procedures which require fusion of the polymer and handling of the molten polymer, i.e. they cannot be readily processed without the use of special equipment except at temperatures so high as to have a detrimental effect on the strength and color of the processed polymer.

Various techniques have been proposed for regulating the molecular weight of such polymers, i.e. for preparing polymers of lower molecular weight and, hence, of improved processability. One such technique involves carrying out the polymerization in an inert organic diluent but such procedure is not generally practical because of the cost of the diluent and the costly inconvenience of separating the polymer product from the organic diluent. Other molecular weight regulating techniques overcome the disadvantages of solvent polymerization but are attended by disadvantages of their own. Thus raising the temperature of the polymerization, while effective in reducing polymer molecular weight involves the danger of a "runaway", i.e. excessively violent, polymerization. Alternatively it is known to regulate molecular weight by carrying out the polymerization in the presence of a reagent which acts as a chain transfer agent to limit the molecular weight of the polymer. Such chain transfer agents contain a functional group which is capable of terminating growing free radical-terminated polymer chains in the polymerization reaction mass. Usually the molecular weight regulating agent transfers an atom or group together with an unpaired electron associated therewith to the free-radical-terminated group or substituent at the end of a growing polymer chain thus stopping the growth of the chain in the polymerization reaction. The resulting free-radical species derived from the molecular weight regulator can then add to another free-radical terminated polymer chain thereby stopping the growth of the latter chain and becoming attached to the chain as an end group. Alternative to adding to polymer chain ends, the free-radical species derived from the molecular weight regulating reagent can, of course, combine with any other free-radical species in the polymerization reaction mass, for example, the free radical or radicals produced by homolytic dissociation of the reaction initiator. Many known reagents can be employed as chain transfer molecular weight lowering agents in molecular weight regulation of vinyl halide polymers, but, in general, the use of known molecular weight control agents is attended by several drawbacks and disadvantages which limit or even prohibit their practical application in polymer production. For example, many molecular weight regulating agents, such as organic mercaptans e.g. alkyl mercaptans, or organometallic compounds, e.g. tetramethyltin, are not only relatively volatile but also malodorous or toxic so that their use as molecular weight regulators in vinyl halide polymerization creates pollution and toxicity problems in locations where the polymer is made and processed.

It is known that polyvinyl halides of diminished molecular weight are obtained when vinyl halide monomer is polymerized in the presence of relatively massive concentrations of aldehydes devoid of ethylenic and acetylenic bonds as a means of preparing crystalline vinyl halide polymers. Thus J. F. Gillespie and P. H. Burleigh, *Polymer Preprints* 1, No. 1, p. 131–138 (1960) and the preliminary communication thereof, P. H. Burleigh, *J. Am. Chem. Soc.* 82 749 (1960), teach polymerization of vinyl chloride in the presence of saturated aldehydes, i.e. aldehydes devoid of ethylenic and acetylenic unsaturation, such as saturated aliphatic aldehydes and aromatic aldehydes, wherein the aldehyde and the vinyl halide monomer are charged to the polymerization in substantially equimolar proportions corresponding to a concentration of about 40 percent or more of the aldehyde based on the weight of the polymerization mass. While the aldehyde reagent lowers the molecular weight of the polymer, it also generally retards the rate of vinyl halide polymerization (see Gillespie and Burleigh, op. cit., p. 136, second paragraph). In addition to the latter serious disadvantage, polymerization of vinyl halide in the presence of the saturated aldehydes as taught by the Gillespie et al, and Burleigh references impairs the solubility of the polymer product in conventional organic solvents for polyvinyl halides. Thus conventional vinyl chloride polymer prepared in absence of an aldehyde is soluble in tetrahydrofuran and cyclohexanone at both room temperature and at moderately elevated temperatures. However the products obtained by polymerizing the vinyl chloride monomer in the presence of aldehyde according to the Gillespie - Burleigh technique are insoluble in tetrahydrofuran at concentrations in excess of 1%, even on heating, and are only soluble in cyclohexanone on heating. The aforementioned relative insolubility of the Gillespie and Burleigh polymers is particularly undesirable since such insolubility limits the utilization of the polymers in applications wherein good solubility of the polymer in organic solvents is desirable or required, e.g. solution casting processes of the type described in *Modern Plastics Encyclopedia* 51, No. 10A, October 1974, p. 301. The prior art technique of Gillespie and Burleigh is also highly disadvantageous in that aldehyde, employed in relatively massive amounts impedes, and in some cases, prevents recovery of the polyvinyl halide product. Thus, in the Gillespie - Burleigh procedure the amount of aldehyde employed in the polymerization is far in excess of that which can react according to the aforementioned chain transfer mechanism. Accordingly, at the end of the polymerization reaction a substantial amount of aldehyde remains which must be removed in order to recover the polymer. In other words, the Gillespie - Burleigh technique suffers from disadvantages at least as serious as those mentioned above in connection with the diluent method of molecular weight regulation. Furthermore, although aldehydes devoid of ethylenic or acetylenic multiple bonds are relatively stable, under conditions of vinyl halide polymerization, particularly at the moderately elevated temperatures conveniently employed therein, the excess aldehyde in the polymerization mass undergoes aldehyde self-condensation reactions forming low melting solids or oils, thereby exacerbating the problem of separating vinyl halide polymer from the reaction mixture. The difficulties encountered in separating the excess saturated aldehyde and/or self condensation products thereof from vinyl halide polymerization product prepared in the presence of the aforementioned massive proportions of aldehyde are illustrated by Example 6 below and by the inability of Gillespie and Burleigh to purify several polyvinyl halide products (see Gillespie and Burleigh, op. cit. Table VI).

M. Imoto et al., Makromol Chem. 48 80 (1961) also disclose that when polymerization of vinyl chloride is carried out in the presence of acetaldehyde in tetrahydrofuran as reaction solvent to impart crystallinity to the polymer, the polymer molecular weight is lowered. Although a more crystalline product is obtained as compared to that obtained by Gillespie and Burleigh, the efficiency of the Imoto et al. polymerization as measured by polymerization rate is substantially reduced by the presence of even small concentrations of the aldehyde in the reaction mixture (see FIG. 3, Imoto et al. op. cit.). Moreover the polymers produced by the solution polymerization technique of Imoto et al. have, like the Gillespie and Burleigh polymers, unsatisfactory low solubilities in conventional organic solvents such as cyclohexanone, tetrahydrofuran and dimethylformamide (see Table 1, Imoto et al. op. cit.).

U.S. Pat. No. 3,160,614 to S. P. Nemphos et al, teaches that in polymerization solvent or diluent unsaturated aldehydes in small concentration, e.g., 0.2% or more based on the weight of vinyl compound, are effective in lowering the molecular weight of the polymer. However, the aldehydes of Nemphos et al. are alphamethyl, alpha, beta-ethylenically unsaturated aldehydes which are structural distinguished from those prescribed by Gillespie and Burleigh and Imoto et al. The Nemphos et al. unsaturated aldehydes are not only more difficult to prepare, and hence, more costly than the latter aldehydes devoid of ethylenic or acetylenic unsaturation, but also are less stable because of their olefinic unsaturation. Furthermore the aforementioned unsaturated aldehydes are capable of undergoing vinyl-type polymerization with vinyl halide monomer to produce polymers structurally distinguished from those prepared in the presence of the saturated aldehydes, i.e. the unsaturated aldehydes react at their carbon-to-carbon double bonds as comonomers with the vinyl halide so that all of the unsaturated aldehyde charged to the polymerization becomes combined within the polymer chain rather than merely at the chain ends. Since the aldehyde functional group of such unsaturated aldehyde residues can also combine to a substantial extent with polymer chain ends according to the chain transfer mechanism described above, vinyl halide polymers prepared in the presence of the unsaturated aldehydes are further distinguished structurally from the corresponding polymers prepared in the presence of the saturated aldehydes in being crosslinked. Moreover, ethylenically unsaturated aldehydes, when charged to vinyl halide polymerizations even in small amounts, e.g. 0.1% based on the weight of vinyl halide, have so great a retarding effect on the polymerization as to terminate the reaction as disclosed in U.S. Pat. No. 2,616,887 to M. H. Danzig, et al.

W. L. Semon, U.S. Pat. No. 1,983,949 teaches polymerization of vinyl chloride in bulk in liquid phase at 100° C. in the presence of a free radical initiator, such as benzoyl peroxide, and an aldehyde reagent which is either the ethylenically unsaturated aldehyde, acrolein, of the type mentioned above or the one carbon atom-containing aldehyde, formaldehyde. The latter aldehyde is distinguished from all higher aldehydes in being devoid of a carbon to carbon bond and in its almost explosive proclivity to polymerize to a stable polymer at 100° C in bulk liquid phase as disclosed by J. Furukawa and T. Saegusa, "Polymerization of Aldehydes and Oxides", Interscience Publishers, 1963, p. 58, lines 12–24, p. 77, lines 24–26 and p. 112, line 21 and last two lines. The result of the Semon process, however, is a vinyl chloride polymer of higher than normal molecular weight and insolubility in all common solvents, i.e., a result contrary to the teachings of this invenion.

SUMMARY OF THE INVENTION

According to the invention the disadvantages associated with prior art polyvinyl halide molecular weight regulating techniques employing aldehydes devoid or ethylenic or acetylenic unsaturation as molecular weight lowering agent are overcome by an improvement in the preparation of a vinyl halide homopolymer, vinyl halide copolymer or vinyl halide graft polymer containing up to about 50% by weight of comonomer devoid of aldehyde substituents and/or a compatible back bone polymer which comprises (1) polymerizing in bulk vinyl halide monomer or vinyl halide monomer in the presence of up to about 50% by weight of said comonomer and/or said back bone polymer and (2) recovering said vinyl halide polymer from said monomer or monomers. This novel improvement comprises carrying out at least part of the polymerization in the presence of a small molecular weight lowering amount of aldehyde which is devoid of ethylenic and acetylenic unsaturation and which contains at least one carbon to carbon bond, whereby the molecular weight of the polymer product is substantially lowered without substantially diminishing the polymerization conversion rate.

Polymerization of vinyl halide in the presence of aldehydes in small amounts according to the invention, i.e. in a concentration less than about 10 percent based on the weight of the polymerization reaction mixture, is highly effective in lowering the molecular weight of the polymer product. Thus the number average molecular weight of a vinyl halide can be diminished by more than about 80% by carrying out vinyl halide polymerization in accordance with the improvement of the invention. The foregoing excellent degree of polymer molecular weight lowering is achieved without the necessity of raising the reaction temperature and without substantially diminishing the polymerization efficiency as measured by polymerization conversion rate, i.e. without lowering the rate of percent conversion of vinyl halide monomer to polymer as computed per unit time, e.g. per hour. The foregoing result was surprising in view of effect of the present aldehydes in retarding the rate of polymerization in vinyl halide polymerization carried out in the presence of a conventional polymerization solvent such as tetrahydrofuran as disclosed by Imoto et al., op. cit., discussed above, or in the absence of conventional solvent but in the presence of massive amounts of the aldehyde as disclosed by Gillespie and Burleigh op. cit. also discussed above.

Vinyl halide polymers obtained by the improved molecular weight lowering process of the invention are characterized by excellent solubility in organic solvents such as tetrahydrofuran, dimethyl formamide and cyclohexanone. Thus, the products of this invention form stable, clear solutions in the aforementioned solvents at ambient or room temperature, i.e. about 25° C, and at moderately elevated temperatures, i.e. about 65° C, even at concentrations of vinyl halide polymer in excess of about 6 percent by weight of the solution as indicated in Example 2 below. This result, which renders the present polymers suitable for applications requiring good solubility in organic solvents, e.g. solution casting processes, is surprising in view of the corresponding relative insolubility of comparable prior art polyvinyl halides prepared in the presence of the saturated aldehydes, e.g. the polyvinyl halides disclosed in Gillespie and Burleigh op. cit.

DETAILED DESCRIPTION OF THE INVENTION AND PREFERRED EMBODIMENTS THEREOF

The present invention is preferably directed to preparation of vinyl halide homopolymers, copolymers, and graft polymers employing vinyl chloride as the vinyl halide. The polymerization can be carried out in a single reaction stage, or if desired, a multi-stage, e.g. a two-stage, reaction configuration. The aldehyde molecular weight regulating agent is preferably present throughout the polymerization but, if desired, the aldehyde can be introduced after the monomer or monomers have partially polymerized. When a two-stage bulk polymerization is desired, it is particularly advantageous to employ a two-stage polymerization in which during the first stage about 3 to about 20% preferably about 3% to about 15%, and especially about 7 to about 12%, by weight of monomer or monomers are converted to polymer using high speed agitation followed by completion of polymerization (corresponding to conversion of about 30–85% of the reaction mixture to polymer) at low speed agitation. This especially desirable two-stage bulk polymerization technique is more particularly described in British Pat. No. 1,047,489 and U.S. Pat. No. 3,522,227, to Thomas, the pertinent disclosure of which patents is incorporated herein by reference. When two-stage polymerization is employed, the aldehyde molecular weight lowering agent is preferably charged at the beginning of the second reaction stage.

Generally, to avoid any impairment in polymerization efficiency, i.e. to prevent any retardation of the conversion rate of vinyl halide monomer to polymer, the amount of aldehyde molecular weight lowering agent charged to the present polymerization will be less than about 10 weight percent based on the weight of the polymerization mass. The amount of aldehyde devoid of ethylenic and acetylenic unsaturation employed in the polymerization to achieve appreciable molecular weight lowering of the polymer product can be as small as about 0.001% based on the weight of the polymerization reaction mixture. Preferably the present molecular weight regulating agent is charged to the polymerization reaction mixture in a concentration of about 0.01 to about 5 weight percent, and is especially about 0.05 to about 1 weight percent based on the weight of the polymerization reaction mass.

The aldehyde reagent employed in bulk preparation of vinyl halide polymer according to the invention is devoid of ethylenic and acetylenic unsaturation, in other words the aldehyde is saturated or if unsaturated, contains only aromatic unsaturation. The aldehyde may contain one aldehyde group per molecule, i.e. it may be a monofunctional aldehyde, or, alternatively, it may contain two, three, four, five or more aldehyde groups per molecule, i.e. it may be a polyfunctional aldehyde. The aldehyde may contain aliphatic hydrocarbon substituents attached to the aldehyde group or groups including acyclic straight and branched chain groups and cycloaliphatic groups. Alternatively, the substituents attached to the aldehyde group or groups can include alkaryl groups, aralkyl groups, or heterocyclic groups including both cycloaliphatic and aromatic heterocyclic groups. In addition to the hydrogen substituents the carbon atoms of the substituents attached to the aldehyde group or groups may contain conventional substituents including hydroxy substituents, inclusive of alcoholic hydroxy groups and phenolic hydroxy groups; ether substituents, e.g. lower alkoxy substituents wherein the lower alkyl groups contain 1 to 8 carbon atoms; ester groups, i.e. either carboalkoxy or carboxylate substituents; halogen, e.g. chlorine, fluorine, and bromine substituents; amino substituents, e.g. primary, secondary and tertiary amino groups, and nitro groups. In general the aldehyde used contains from 2 to 30 carbon atoms, preferably 2 to 20 carbon atoms. Typical examples of aldehydes useful in the invention include the following typical examples: trifluoroacetaldehyde, acetaldehyde, propionaldehyde, glyoxal, 2,2,2-trifluropropionaldehyde, iobutyraldehyde, chloroacetaldehyde, 2-chloropropionaldehyde, dichloroacetaldehyde, methoxyacetaldehyde, trichloroacetaldehyde, pentanal (valeraldehyde), butylacetaldehyde, dimethylethylacetaldehyde, ethoxyacetaldehyde, methylisopropylacetaldehyde, 2-bromoisobutyraldehyde, 2-ethylbutyraldehyde, methyl-n-propylacetaldehyde, n-propoxyacetaldehyde, isobutylacetaldehyde, 3-methoxy-isobutyraldehyde, 3-chloropropionaldehyde, caproaldehyde, ethylisopropylacetaldehyde, cyclopentylaldehyde, tetrahydrofurfural, 5-methylhexanal, ethylisobutylacetaldehyde, di-n-propylacetaldehyde, hexahydrobenzaldehyde, 2-ethylhexanal-1,2,2,3-trichloro-n-butyraldehyde, 3-fluorobenzaldehyde, 2,2,2-tirbromoethanal, 4-fluorobenzaldehyde, 2-fluorobenzaldehyde, benzaldehyde, glutaraldehyde, phenylacetaldehyde, salicylaldehyde, 3-tolualdehyde, 2-tolualdehyde, 4-tolualdehyde, capraldehyde, 2-chlorobenzaldehyde, phenoxyacetaldehyde; 3,5-dimethylbenzaldehyde, 3-phenylpropionaldehyde, 2,6-dimethylbenzaldehyde, 3-methoxybenzaldehyde, 3-bromobenzaldehyde, 4-isopropylbenzaldehyde, 3-ethyoxybenzaldehyde, 4-methoxybenzaldehyde, 4-ethoxybenzaldehyde, 3,4-diethoxybenzaldehyde, diphenylacetaldehyde, 7-methyloctanal, methyl-n-hexylacetaldehyde, 2,3-dichloro-n-butyraldehyde, n-octaldehyde, pelargonic aldehyde, undecanal, n-tridecyladehyde, 2-hydroxypropionaldehyde, 3-phenyl-2-methylpropanal, methyl-n-butylglycolic aldehyde, phenoxyacetaldehyde, cyclohexylacetaldehyde, 2,3,6-trimethylbenzaldehyde, 3,5-dimethylhexahydrobenzaldehyde, methylphenylglycolic aldehyde, 2,4,6-trimethylbenzaldehyde, ethylphenylglycolic aldehyde, 2-hydroxybutanal, 1,2,3,4-tetrahydro-2-napthaldehyde, 2-(1-naphthyl)-propionaldehyde, adipic dialdehyde, phenylglyoxal, 4-Isopropylbenzaldehyde, 2-phenoxybenzaldehyde, 1-naphthaldehyde, 4-chloro-n-butyraldehyde, 2,3-dichloropropionaldehyde, 4-hydroxybutanal, 2-Isopropyl-3-hydroxypropionaldehyde, 3-methyl-3-hydroxybutanal, 2-methyl-4-methoxy-p-butyraldehyde, 2-phenylpropionaldehyde, 3-pyridinaldehyde, 3-chlorobenzaldehyde, 2,3,5,6-tetramethylbenzaldehyde, 2-ethoxybenzaldehyde, tetradecanal, pentadecanal, hexadecanal, phenylacetaldehyde, 4-methoxy-1-naphthaldehyde, heptadecanal, 3,4-methylenedioxybenzaldehyde, 2-Iodobenzaldehyde, stearaldehyde, 2-methoxybenzaldehyde, 2-aminobenzaldehyde, 4-diethylaminobenzaldehyde, dodecanal, 2-nitrobenzaldehyde, 3,4-dimethoxybenzaldehyde, 4-chlorobenzaldehyde, benzylglycolic aldehyde, 4-chloro-2-hydroxybenzaldehyde, quinoline-4-aldehyde, 2,3- diphenylpropionaldehyde, 2,3-dimethoxybenzaldehyde, 9-hydroxynonanal, 3-benzyloxybenzaldehyde, isoquinaldehyde, phthaldehyde, 4-bromobenzaldehyde, 3-nitrobenzaldehyde, 2-phenanthraldehyde, 1-hydroxy-2-naphthaldehyde, 2-naphthaldehyde, 4-phenylbenzaldehyde, 3-methoxy-4-ethoxybenzaldehyde, 5-methoxy-1-naphthaldehyde, 2,6-dichlorobenzaldehyde, quinoline-2-aldehyde, quinoline-6-aldehyde, 3,4,5-trimethoxybenzaldehyde, 4-iodobenzaldehyde, 3-phenanthraldehyde, 2-methoxy-1-napthaldehyde, 2,3,6-trichlorobenzaldehyde, isophthaldehyde, hydroxyacetaldehyde, 3-chloro-n-butyraldehyde, 2,3,4,6tetrachlorobenzaldehyde, benzaldehyde-2-carboxylic acid, and its ethyl ester, 9-phenanthraldehyde, 3-hydroxybenzaldehyde, 4-nitrobenzaldehyde, 1-phenanthraldehyde, 2-ethoxy-1-naphaldehyde, 3,4-dihydroxybenzaldehyde, 3,5-dihydroxybenzaldehyde, 3,5-dichloro-4-hydroxybenzaldehyde, hydroxypyruvicaldehyde, diphenylglycolicaldehyde, benzaldehyde-3-carboxylic acid and its n-hexylester, 3,4-benzpyrenealdehyde, 3,4,5-trihydroxybenzaldehyde, benzaldehyde-4-carboxylic acid, 4-hydroxybenzaldehyde, terephthalaldehyde, 2,4,6-trimethoxybenzaldehyde, 1-bromo-2-naphthaldehyde, pyrene-3-aldehyde, 1,2,3,4-tetrahydrophenanthrene-9-aldehyde, eicosanol, pentacosanal and triacontanal.

Also there can be used in the improved process of the invention, mixtures of these aldehydes, as well as isomeric and homologous aldehydes and equivalent aldehydes, devoid of ethylenic and acetlyenic unsaturation disclosed by Gillespie and Burleigh op. cit.

Preferably the aldehyde which is used as molecular weight lowering agent in the present improved process in an aliphatic aldehyde. In order to void steric hindrance at the aldehyde functional group, the aldehyde employed is preferably devoid of chain branching at the carbon alpha to the aldehyde group, and more preferably is a straight chain aliphatic aldehyde. It is preferred to use aldehydes having only one aldehyde group per molecule since such compounds are more readily available, more readily prepared, and hence, less costly than aldehydes containing two or more aldehyde groups per molecules. For a similar reason it is also preferred to employ aldehydes containing only hydrogen substituents in the organic radical attached to the aldehyde group. Aldehydes containing 2 to 12 carbon atoms are especially preferred for use in the invention because of the ease of handling and the ready availability of such compounds. When it is desirable or advantageous to employ a molecular weight lowering reagent which has especially low volatility, use of an aldehyde containing four or more carbon atoms according to the invention provides an especially good result.

The vinyl halide monomers included within the scope of the invention include, e.g., vinyl fluoride, vinyl chloride, vinyl bromide, vinyl iodide, vinylidene fluoride, vinylidene chloride, vinylidene bromide, vinylidene iodide and the like, although vinyl chloride is preferred. It is intended to include within the scope of the invention alpha-halo-substituted ethylenically unsaturated materials and, thus, the invention is intended to cover homopolymers, copolymers, including terpolymers and tetrapolymers, and graft copolymers formed by addition polymerization. Illustrative of these copolymers is a copolymer of vinyl chloride and vinylidene chloride. Illustrative graft copolymers are vinyl halide graft copolymers derived from vinyl halide - compatible backbone polymers such as ethylene propylene rubber, ethylene propylene diene modified rubber, olefin-acrylic ester copolymers, ethylene-vinyl acetate copolymers, etc. Suitable vinyl halide graft copolymers are disclosed in copending application Ser. No. 427,895, filed Dec. 26, 1973; Ser. No. 251,100, filed May 8, 1972, and U.S. Pat. 3,544,660, to J. C. Thomas et al., the disclosures of which are incorporated herein by reference. The term "vinyl halide polymer" as used in this specification and claims is intended to include both homopolymers and copolymers of vinyl halide. As used in the present specification and claims the term copolymer is inclusive not only of binary copolymers but also of terpolymers, tetrapolymers etc.

While it is preferred that the monomer composition be comprised totally of vinyl halide monomer as described above, i.e., a polyvinyl halide, the present invention is also intended to include copolymers formed by the free-radical addition polymerization of a monomer composition containing a predominant amount, e.g. at least 50% of vinyl halide and a minor amount e.g., up to 50% by weight of another ethylenically unsaturated monomer material copolymerized therewith. In order to avoid formation of polymer products containing with in the polymer chains an appreciable portion of monomer residues substituted with aldehyde groups and also containing the cross-links which derive from the presence of such aldehyde substituted residues as explained above, the ethylenically unsaturated comonomer material which may be employed in the present polymerization should be devoid of aldehyde substituents. Preferably the other ethylenically unsaturated monomer material is used in amounts of less than 25% by weight and more preferably in amounts less than 10% by weight of the total monomer materials used in preparing the polymer. Suitable ethylenically unsaturated monomer materials devoid of aldehyde substituents which can be used to form copolymers, including binary copolymers, terpolymers, interpolymers and the like, are illustrated by the following monoolefinic hydrocarbons, i.e., monomers containing only one carbon to carbon double bond, including such materials as ethylene, propylene, 3-methylbutene-1, 4-methylpentene-1, pentene-1, 3,3-dimethylbutene-1,4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl, propyl, or butyl styrene; phenyl styrene, and halogenated styrenes such as alphachlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl crotonate; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alphachloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alphachloroacrylate, and ethyl alpha-chloroacrylate, methyl alpha-chloroacrylate, and ethyl alpha-chloroacrylate, methyl alpha-bromoacrylate, ethyl alphabromo-caprylate, methyl alpha-fluoracrylate, ethyl alpha-fluoracrylate, methyl alpha-iodoacrylate and ethyl alpha-iodoacrylate; alkyl alphacyanoacrylates, e.g., methyl alpha-cyanoacrylate and ethyl alpha-cyanoacrylate and alkyl alpha-cyanoacrylates, e.g., methyl alpha-cyanoacrylate and ethyl alphacyanoacrylate; maleates, e.g., monomethyl maleate, monoethyl maleate, dimethyl maleate, diethyl maleate; and fumarates, e.g. monomethyl fumarate, mono-ethyl fumarate, dimethyl fumarate, diethyl fumarate; and diethyl glutaconate; monoolefinically unsaturated organic nitriles including, for example, furmaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumdaric and itaconic acids, maleic anhydride, and the like. Amines of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl betachloroethyl sulfide, vinyl beta-ethoxyethyl sulfide and the like can also be included. Diolefinically unsaturated hydrocarbons which are devoid of aldehyde substituents and which contain two olefinic groups in conjugated relation and the halogen derivatives thereof, e.g., butadiene-1,3; 2-methyl butadiene-1,3; 2,3-dimethylbutadiene-1,3; 2-methyl-butadiene-1,3; 2,3-dimethyl-butadiene-1,3; 2-chloro-butadiene-1,3; 2,3-dichlorobutadiene-1,3; and bromo-butadiene-1,3 and the like, are also suitable as ethylenically unsaturated monomers.

Specific monomer compositions for forming copolymers can be illustrated by vinyl chloride and vinylidene chloride, vinyl chloride and vinyl acetate, vinyl chloride and vinylidene chloride and/or maleic or fumaric acid esters, vinyl chloride and vinylidene chloride and/or acrylate or methacrylate esters, vinyl chloride, vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed solely from vinyl halide monomer and most preferably solely from vinyl chloride.

The added monomer or monomers can be the same or different than the vinyl halide polymer and, where different, the monomer or monomers are preferably selected from those classes of monomers which polymerize at the same or a faster rate in a theoretical bulk polymerization process as compared to said vinyl halide. Up to 50% of a comonomer can be used.

As is conventional in bulk vinyl halide polymerizations it is preferable to carry out the present process in the presence of a free-radical initiator for the polymerization. Useful free-radical initiators are organic or inorganic peroxides, persulfates, ozonides, hydroperoxides, peracids and percarbonates, diazonium slats, diazotates, peroxysulfonates, trialkyl borane-oxygen systems, amine oxides, and azo compounds.

Typical initiators which have been employed in bulk polymerization of vinyl halide and which can be used in the improved polymerization process of the invention include the following representative compounds: lauroyl peroxide, benzoyl peroxide, diacetyl peroxide, azobisisobutyronitrile, peracetic acid, diisopropyl peroxydicarbonate, azo-bis-isobutyramidine hydrochloride, t-butyl peroxypivalate, azocyclohexyl nitrile, 2,4-dichlorobenzoyl peroxide, acetyl cyclohexane sulfonyl peroxide, and 2,2'-azo-bis-(2,4-dimethyl valeronitrile). These and other suitable initiators are more particularly described by J. Brandrup and E. H. Immergut, Editors "Polymer Handbook", Interscience Publishers, 1966, Chapter II entitled "Decomposition of Organic Free Radical Initiators", the pertinent disclosure whereof is incorporated herein by reference. The initiator according to the invention is preferably an organic azo compound or an organic peroxy compound, especially an organic peroxide. Advantageously, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking.

In accord with conventional practice in the bulk vinyl halide polymerization art the amount of initiator required for initiation of the present polymerization is quite small, e.g. about 0.01 to about 1%, preferably about 0.05 to about 0.5% based on the total weight of all monomers in the polymerization reaction mass.

The polymerization mass of the present improved molecular weight lowering process should be substantially devoid of cations of metals, e.g., cerium and manganese, which have several stable positive oxidation states and which can react with, i.e. be reduced by, aldehyde functional groups as disclosed by U.S. Pat. No. 2,922,768 to G. Mino et al. and U.S. Pat. No. 3,301,838 to E. I. Heiba.

The polymerization conditions, e.g. the reaction temperature and pressure employed in carrying out the improved process of the present invention are substantially similar to those conventionally employed in bulk polymerization of vinyl halide. The present process can be used to obtain low molecular weight vinyl halide polymers at polymerization temperatures ranging from about −60° C to about 90° C. Preferably the polymerization in the presence of the aldehyde molecular weight lowering agent according to the invention is effected at about 30° C to about 80° C, especially at about 50° to about 75° C. Also in accord with conventional practice in the bulk vinyl halide polymerization art, the present polymerization is generally carried out under sufficient superatmospheric pressure, usually at least the autogeneous superatmospheric pressure developed by the reaction mass in a sealed reactor at the particular temperature employed, so as to maintain the reaction mass substantially in the liquid phase. Typically, using especially preferred polymerization temperatures, the pressure employed in polymerizing vinyl chloride according to the invention may range from about 80 to about 210 pounds per square inch or higher and especially is about 90 to about 190 pounds per square inch.

The product of the present improved polymerization is readily recovered from unreacted monomer by venting the latter from the reaction vessel.

In the liquid phase bulk polymerization method of the invention, all other conditions and measures are also those conventionally employed in the previously known processes for bulk polymerization of vinyl halide as typified for example by the bulk two-stage polymerization for vinyl chloride disclosed in the aforementioned British Pat. No. 1,047,489 and U.S. Pat. No. 3,522,227. In an integrated polymerization process of the invention employing the aforementioned two-stage bulk technique for polymerization of vinyl halide, wherein the present improvement is preferably carried out in the second stage, the reaction is conducted in a first stage reactor with means chosen to agitate the monomer or monomers or a type capable of providing high sheer and commonly referred to as a "radical turbine type" agitator. At the start of the first stage reaction, the vessel is charged with a monomer composition to which an initiator has been added. Any polymerization initiator generally used in bulk polymerization methods, i.e. those hereinabove described, can be used to an extent which is usual for bulk polymerization processes.

After addition of the vinyl halide monomer to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor. These figures should not be regarded as limiting values. When a conversion of at least about 3 to about 20 percent of the monomer composition has been obtained in the first stage reactor, the contents of the vessel are transferred to a second stage polymerization vessel which is equipped to provide slow speed, low shear agitation so as to insure proper temperature control of the reaction medium and which contains, the aldehyde molecular weight lowering agent of the invention and advantageously additional monomer together with additional initiator, if desired. Generally the polymerization in the second stage is completed when about 30 to 85% or more by weight of the reaction mixture has been converted to polymer. As described above the product polymer is readily recovered from resultant reaction mixture consisting mostly of said product and unreacted monomer by venting the latter from the reaction vessel.

The polymerization products of the present invention can be admixed with various conventional inert additives, such as fillers, dyes, and pigments. In addition, the polymerization products can be admixed with conventional plasticizers, lubricants, thermostabilizers, antioxidants, and ultraviolet light stabilizers as desired. The aforementioned inert additives and conventional stabilizers and adjuvants are added to the polymer according to known processing techniques.

Because of their lower molecular weights the present polymers (as compared to corresponding polymers of higher molecular weight prepared at the same temperature in absence of the present aldehyde molecular weight regulating agent) have substantially lower melting or fusion points and/or lower melt viscosities and hence are more easily processed, e.g., fused, extruded, molded, etc. in conventional processing equipment without requiring use of extreme temperatures which would have a detrimental effect on polymer strength and color. The excellent fusion and extrusion characteristics of the present polymers make them particularly suitable for flexible packaging extrusion applications, injection and blow molding, the manufacture of flexible bottles, and fusion powder applications, e.g., powder static fusion processes such as fluidized bed coating, rotocasting, electrostatic deposition, and powder flow coating.

As compared to vinyl halide polymers prepared in the presence of massive amounts of aldehydes devoid of ethylenic and acetylenic unsaturation, i.e. amounts of aldehyde equimolar with respect to the amount of vinyl halide monomer charged to the polymerization, the present polymers are distinctively characterized by substantially improved solubility in typical vinyl halide solvents such as tetrahydrofuran. This surprising improvement in the solubility of the present facilitates their use in applications requiring excellent solubility of the polymer in such organic solvents, for example, in the solution casting of polyvinyl halide.

The improved process of the invention is particularly advantageous in that it accomplishes molecular weight reduction without the use of mercaptans, organo-metallic compounds or other molecular weight lowering agents which produce noxious odors or toxicity problems in the work area environment in which the vinyl halide polymer is made or in which it is processed.

In order to further illustrate this invention but without being limited thereto, the following examples are given. In this specification and claims, all parts, percentages and proportions are by weight and all temperatures are in degress centigrade unless otherwise specified.

EXAMPLE 1 (CONTROL)

A 1 liter cylindrical glass reaction vessel is equipped with a helical agitator, temperature and pressure sensors, a venting valve and is surrounded by a jacket containing an aqueous constant temperature bath. The reaction vessel is checked for leaks by pressurization with nitrogen and charged with 560 g. of vinyl chloride and 0.5 g. of lauroyl peroxide initiator. After the reaction vessel is sealed, about 20 g. of the vinyl chloride is vented from the vessel to remove entrapped air, thereby providing a net charge of vinyl chloride of about 540 g. The reaction mixture is heated under agitation to about 71° under an autogenous pressure of about 170 p.s.i.g. and maintained under these temperature and pressure conditions for two hours. The reaction vessel is allowed to cool to ambient temperature and the polyvinyl chloride product therein is recovered by venting unreacted vinyl chloride from the reactor. There is obtained 98.5 g. of polyvinyl chloride product which corresponds to a conversion based on vinyl chloride charged of 18% or to a conversion rate of about 9% per hour. The polyvinyl chloride has a number average molecular weight of about 23,200.

EXAMPLE 2

The procedure of Example 1 is repeated substantially as described except that the net amount of vinyl chloride charged is 520 g. and together with the vinyl chloride and lauroyl peroxide initiator there is introduced into the reactor 56.3 g. (98% based on the weight of the reaction mass) of acetaldehyde. There is obtained after a reaction period of two hours 95.1 g. of polyvinyl chloride which corresponds to a conversion of 18.3% based on vinyl chloride monomer charged or to a conversion rate of about 9.15% per hour. The number average molecular weight of the product is only 3,800 corresponding to a molecular weight lowering of about 83.6% as compared to the product of control Example 1.

The solubility of the polymer product is tested by adding 12.6 g. of the product to 200 ml. (178 g.) of tetrahydrofuran and agitating the mixture at 65° for 30 minutes. There is obtained a clear solution of the polymer in the solvent which solution remains clear even on standing at ambient temperature for one week. When the foregoing solubility test is performed employing dimethyl formamide or cyclohexanone in place of the tetrahydrofuran substantially similar clear, stable solutions of the polymer product are obtained.

The above described production of clear solutions of the polymer product in tetrahydrofuran at both 65° and at ambient temperature distinguishes the constitution of the present product from that of polymer product obtained from bulk vinyl chloride polymerization in the presence of massive aldehyde concentrations e.g. an equimolar ratio of aldehyde to vinyl chloride, since the latter polymer product is not completely soluble in tetrahydrofuran at ambient or even elevated temperature (see the aforementioned reference of Gillespie and Burleigh, op. cit., especially p. 136, lines 22–24.)

The polymer product is precipitated from the above described solution of polymer in tetrahydrofuran by addition thereto of 500 ml. of methanol. The precipitated polymer is collected by filtration, and dried. One gram of the resultant dried precipitated polymer is analyzed by infrared spectrography to determine the ratio of absorbence at 635 cm$^{-1}$ to that at 692 cm$^{-1}$ said ratio being a measure of the crystallinity of the polymer. The ratio of infra red absorbence at 635 cm$^{-1}$ to absorbence at 692 cm$^{-1}$ (i.e. $D_{635}/D_{692}$ of the product) is only 1.6, as compared to a ratio of 1.5 obtained for a comparable commercial vinyl chloride homopolymer prepared in absence of the aldehyde. This result indicating that the degree of crystallinity of the present polyvinyl chloride is substantially the same as that of conventional vinyl chloride homopolymer serves to distinguish the present product from prior art polyvinyl chloride obtained by polymerization in solution in the presence of acetaldehyde since in the polymer obtained by solution polymerization the $D_{635}/D_{692}$ ratio is at least 2 even at low aldehyde concentrations as described in FIG. 8 of M. Imoto et al., Makromol. Chem. 48 80 (1961).

EXAMPLE 3

The polymerization procedure of Example 2 is repeated substantially as described in polymerizing a net charge of 510 g. of vinyl chloride with 10.6 g. (2.0%) of n-lauroyl aldehyde for one hour. There is obtained 54.9 g. of vinyl chloride polymer (10.7% conversion corresponding to a conversion rate of 10.7% per hour) which has a number average molecular weight of about 16,000 corresponding to a molecular weight lowering of about 31% as compared to the product of control Example 1.

EXAMPLE 4

The polymerization procedure of Example 2 is repeated substantially as described in polymerizing for 1.1 hours a net charge of 520 g. of vinyl chloride with 2.6 g. (0.5%) of n-lauroyl aldehyde. There is obtained 51.6 g. of vinyl chloride polymer (9.9% conversion corresponding to a conversion rate of about 9.0% per hour) which has a number average molecular weight of 19,000 corresponding to a molecular weight lowering of about 18.1% as compared to the product of control Example 1.

EXAMPLE 5

The polymerization of Example 2 is repeated substantially as described in polymerizing for one hour a net charge of 515 g. of vinyl chloride with 0.49 g. (0.095%) of n-butyraldehyde. There is obtained 49.6 g. of vinyl chloride polymer (about 9.6% conversion corresponding to a conversion rate of about 9.6% per hour) which has a number average molecular weight of about 21,000 corresponding to a molecular weight lowering of about 9.5% as compared to the product of control Example 1.

When the foregoing procedure is repeated employing isobutyraldehyde as molecular weight lowering agent in place of the n-butyraldehyde a substantially similar low molecular weight vinyl chloride polymer is obtained.

EXAMPLE 6 (CONTROL)

The polymerization procedure of Example 1 is repeated substantially as described in polymerizing for 1.5 hours a mixture of 280 g. (net) of vinyl chloride and 200 g. (41.6%) of isobutyraldehyde employing 0.5 g. of benzoyl peroxide as the initiator. There is obtained as product a mixture of solid and non-volatile oil. The reaction product is diluted with 300 ml. of methanol and filtered to collect the solid, which is then dried. There is thus obtained 7.4 g. of polyvinyl chloride (2.64% conversion corresponding to a conversion rate of only 1.76% per hour) which has a number average molecular weight of about 1,200.

The methanolic filtrate is diluted with water whereupon an oil separates. The oil is decanted from the aqueous methanolic mixture and dried in a rotary evaporator. There is thus obtained 25.0 g. of solid which melts slightly above room temperature and is believed to be substantially an aldehyde self condensation product.

The following example illustrates the use of the present improved molecular weight lowering technique in a bulk polymerization of vinyl chloride carried out in two reaction stages.

EXAMPLE 7

A polyvinyl chloride is prepared in a two-stage, bulk polymerization process by adding to an ice-water cooled one-liter stainless steel reactor, 0.12 g. of Lupersol 228-P (29% solution of acetyl cyclohexane sulfonyl peroxide in dimethyl phthalate manufactured by Lucidol Div. of Pennwalt Corp.) and 0.1 g. of 2,2-azobis(2,4-dimethyl valeronitrile). The reactor is pressurized with nitrogen to test for leaks and placed under vacuum. Subsequently 500 g. of vinyl chloride is introduced, following which 50 g. of the vinyl chloride are vented to the atmosphere to remove entrapped air. The reaction mass is heated at 70° under a pressure of about 170 p.s.i.g. while being agitated with a turbine agitator operating at about 1500 revolutions per minute. After 20 minutes the agitation speed is reduced to about 300 revolutions per minute and the reaction mass, wherein about 10 percent of the vinyl chloride has polymerized, is flowed under pressure to a two-liter glass reactor containing a mixture of 300 g. of vinyl chloride about 0.7 g. of lauroyl peroxide initiator and 0.7 g. (0.1% based on the weight of the reaction mixture) of n-butyraldehyde which is agitated with an interrupted screw stirrer operating at about 235 revolutions per minute. After a 50 g. portion of the vinyl chloride is removed by venting, the stirred reaction mass is heated at 71° for 2 hours at under a pressure of about 170 p.s.i.g. The solid vinyl chloride polymer product is recovered by venting unreacted vinyl chloride monomer from the reactor. The polyvinyl chloride product is obtained at a conversion rate and in desirable low molecular weight which are substantially similar to those of the comparable single stage polymerization of Example 5.

In the foregoing Examples 2-5 and 7 which are illustrative of the invention it will be apparent that many process changes and variations of reaction conditions and reagents can be made without departing from either the spirit or scope of the invention. For example, if desired, a portion, e.g. about 10%, of the vinyl chloride reactant may be replaced by a compatible monomer, e.g. methyl acrylate, to obtain a vinyl chloride-methyl acrylate binary copolymer of a substantially lower molecular weight than the corresponding binary copolymer prepared in absence of the aldehyde molecular weight lowering reagent of the invention.

Also, if desired, the monofunctional aldehydes used in the aforementioned illustrative examples may be replaced with aldehydes containing more than one aldehyde group per molecule, for example dialdehydes such as glyoxal or succinaldehyde; trialdehydes such as trimellitic aldehyde or tetraaldehydes such as pyromellitic aldehyde.

While the invention has been described with reference to certain specific embodiments, it will be recognized that many additional variations are possible without departing from the scope and spirit of the invention.

What is claimed is:

1. In the process for preparation of a vinyl halide homopolymer, vinyl halide copolymer or vinyl halide graft polymer containing up to about 50% by weight of comonomer devoid of aldehyde substituents and/or a compatible back-bone polymer by bulk liquid phase polymerization which comprises:
   1. polymerizing a vinyl halide monomer composition comprising 0% to about 50% by weight of said comonomer and/or said back-bone polymer at a temperature of about −60° C to about 90° C;
   2. recovering the resulting vinyl halide polymer from said monomer or monomers, the improvement which comprises carrying out at least part of the polymerization in the presence of a small molecular weight-lowering amount of an aldehyde which is devoid of ethylenic and acetylenic unsaturation and which contains at least one carbon to carbon bond, whereby the molecular weight of the vinyl halide polymer product is substantially lowered without substantial lowering of the rate of conversion of vinyl halide to polymer, said amount of aldehyde being less than about 10 weight percent based on the weight of polymerization mixture.

2. The process as claimed in claim 1 wherein the vinyl halide is vinyl chloride, the aldehyde is an aliphatic aldehyde of 2 to 20 carbon atoms, employed in a concentration of about 0.01 to about 5 percent based on the weight of the polymerization mass and the entire polymerization is carried out in the presence of said aldehyde.

3. The process as claimed in claim 2 wherein the vinyl chloride polymer is a homopolymer, the polymerization temperature is about 30° to 90° Centigrade, the aldehyde employed is devoid of chain-branching at the carbon atom alpha to the aldehyde group, and the polymerization is carried out in the presence of an initiating amount of a free radical initiator for the reaction.

4. The process as claimed in claim 3 wherein the aldehyde employed contains only one aldehyde group per molecule, the aldehyde concentration is about 0.05 to about 1% based on the weight of the polymerization mass and the initiator is an organic peroxy-or azo- compound employed in a concentration of about 0.01 to about 0.01 to about 1% based on the weight of vinyl chloride.

5. The process as claimed in claim 4 wherein the aldehyde is a straightchain aliphatic aldehyde of 2 to 12 carbon atoms wherein the aliphatic substituent attached to the aldehyde group contains only hydrogen substituents, the polymerization is carried out at about 50° to about 75° Centigrade at autogenous superatmospheric pressure and the initiator is an organic peroxide.

6. The process as claimed in claim 5 wherein the aldehyde is acetaldehyde.

7. The process as claimed in claim 5 wherein the aldehyde is n-butyraldehyde.

8. The process as claimed in claim 5 wherein the aldehyde is n-lauryl aldehyde.

9. The process as claimed in claim 1 wherein the polymerization is a bulk polymerization in two stages, wherein the first stage reaction mixture is subjected to high speed agitation until about 3 percent to about 20 percent of said monomer or monomers have been converted to polymer and wherein the resultant reaction mixture is subjected to low speed agitation in the second stage until the polymerization has been completed.

10. The process as claimed in claim 9 wherein the vinyl halide polymer is a vinyl chloride homopolymer, and the second stage of the two-stage reaction is carried out in the presence of the aldehyde.

11. A two-stage liquid phase bulk process for the preparation of a low molecular weight vinyl chloride polymer wherein said bulk polymerization is carried out at about −60° C to about 90° C and comprises the steps of
   1. polymerizing in the first stage a vinyl chloride composition comprising 0% to 50% by weight of a comonomer devoid of aldehyde substituents while subjecting the reaction mixture to high speed agitation until about 3 weight percent to about 15 weight percent of said monomer or monomers have polymerized, 2. subjecting the resultant reaction mixture to low speed agitation in the second stage to complete the polymerization in the presence of a small molecular weight lowering amount of an aldehyde of 2 to 30 carbon atoms devoid of ethylenic and acetylenic unsaturation and,
3. recovering the resulting polymer from unreacted monomer or monomers, whereby the vinyl chloride polymer product is of lower molecular weight than the corresponding polymer obtained by polymerization in absence of said aldehyde but the conversion rate of vinyl chloride to polymer is at least substantially the same as that of the polymerization carried out in absence of said aldehyde.

* * * * *